US010014599B2

(12) United States Patent
Baldauf

(10) Patent No.: US 10,014,599 B2
(45) Date of Patent: Jul. 3, 2018

(54) CRIMP TOOL FOR FORMING A FORM-LOCKED AND FORCE-LOCKED CRIMP CONNECTION IN PARTICULAR FOR A COAXIAL CONNECTOR

(71) Applicant: Rosenberger Hochfrequenztechnik GmbH & Co. KG, Fridolfing (DE)

(72) Inventor: Walter Baldauf, Fridolfing (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 0 days.

(21) Appl. No.: 14/722,741

(22) Filed: May 27, 2015

(65) Prior Publication Data

US 2015/0255893 A1 Sep. 10, 2015

Related U.S. Application Data

(62) Division of application No. 13/295,372, filed on Nov. 14, 2011, now Pat. No. 9,270,037.

(30) Foreign Application Priority Data

Nov. 18, 2010 (DE) ........................ 10 2010 051 775

(51) Int. Cl.

*B23P 19/00* (2006.01)
*H01R 43/042* (2006.01)

(Continued)

(52) U.S. Cl.

CPC ......... *H01R 9/0518* (2013.01); *H01R 43/048* (2013.01); *H01R 43/058* (2013.01);

(Continued)

(58) Field of Classification Search

CPC .. H01R 9/0518; H01R 43/048; H01R 43/058; Y10T 29/53235; Y10T 29/49123; Y10T 29/532

(Continued)

(56) References Cited

U.S. PATENT DOCUMENTS

| | | | |
|---|---|---|---|
| 3,984,912 A | 10/1976 | Johnston et al. | |
| 5,217,392 A | 6/1993 | Hosier, Sr. | |

(Continued)

FOREIGN PATENT DOCUMENTS

| | | | |
|---|---|---|---|
| DE | 1942895 | A1 | 2/1970 |
| DE | 19523795 | C1 | 12/1996 |
| DE | 19935933 | A1 | 3/2000 |

*Primary Examiner* — Donghai D Nguyen

(74) *Attorney, Agent, or Firm* — DeLio, Peterson & Curcio, LLC; Robert Curcio

(57) ABSTRACT

A crimp tool for creating a crimp connection between a coaxial cable having an inner conductor, an outer conductor, and a coaxial connector having an outer conductor part, employing an anvil to hold the outer conductor part, the anvil having a recess with an arcuate face of a first radius of curvature, and anvil arm points at each end of the arcuate face, and employing a die to apply the crimping force, the die having a recess with an arcuate face of a second radius of curvature, wherein said die recess extends over an internal angle of approximately 180°, terminating in two parallel arms, where a radial force is applied from outside on the outer conductor part over at least a part of the circumference of the outer conductor part, such that a cold weld is achieved.

6 Claims, 2 Drawing Sheets

(51) Int. Cl.
*H01R 9/05* (2006.01)
*H01R 43/048* (2006.01)
*H01R 43/058* (2006.01)

(52) U.S. Cl.
CPC ........ *Y10T 29/49123* (2015.01); *Y10T 29/532* (2015.01); *Y10T 29/53235* (2015.01)

(58) Field of Classification Search
USPC ...... 29/283.5, 517, 753, 857, 862; 174/75 C, 174/360; 439/98, 607.41, 877
See application file for complete search history.

(56) References Cited

U.S. PATENT DOCUMENTS

| | | | | |
|---|---|---|---|---|
| 5,542,861 | A | 8/1996 | Anhalt et al. | |
| 5,561,267 | A * | 10/1996 | Fudoo .................. | H01R 13/052 439/877 |
| 6,239,373 | B1 * | 5/2001 | Sato ....................... | H01R 4/723 174/75 C |
| 6,793,532 | B2 * | 9/2004 | Saito .................... | H01R 9/0518 439/607.41 |
| 7,409,847 | B2 * | 8/2008 | Wightman ........... | H01R 43/058 29/283.5 |
| 2002/0106918 | A1 | 8/2002 | Saito et al. | |

* cited by examiner

CRIMP TOOL FOR FORMING A FORM-LOCKED AND FORCE-LOCKED CRIMP CONNECTION IN PARTICULAR FOR A COAXIAL CONNECTOR

BACKGROUND OF THE INVENTION

1. Field of the Invention

The present invention relates to a crimp tool for creating a crimp connection between a coaxial cable which comprises, arranged coaxially in relation to one another, an inner conductor, an outer conductor, a dielectric arranged between the outer conductor and inner conductor, and a jacket made of an electrically insulating material surrounding the outer conductor, and a coaxial connector, which possesses an outer conductor part. The crimp tool possesses an anvil to hold the outer conductor part which is to be crimped as well as a die to apply the crimping force.

2. Description of Related Art

Crimp connections, in which two components are connected together through plastic deformations, represent a proven mechanical connection technique and are widely known.

Usually, the cross section of such known crimp connections represents a so-called hexagonal crimp, in which a supporting sleeve is hexagonal in cross section and is pressed, i.e., crimped, onto the inner conductor or onto a shield braid or an outer conductor arranged between the two. However, this only results in a pointwise connection being formed between the supporting sleeve and the outer conductor part. This means that approximately 60% of the shielding strands of the outer conductor of the coaxial cable remain loose, so that both the positive fit and the force locking of such a connection are only serviceable to a limited extent.

SUMMARY OF THE INVENTION

The invention is therefore based on the problem of developing a crimp tool in order to eliminate the described disadvantages such that both the positive fit and the force locking of such a connection are significantly improved and it is also made possible for other materials than those previously used to be used for the crimp sleeve or the outer conductor part serving as a crimp sleeve.

Bearing in mind the problems and deficiencies of the prior art, it is an object underlying the invention to provide a crimping tool for forming a cold weld between a supporting sleeve, an outer conductor part, and an outer conductor of a coaxial cable, wherein the crimping tool comprises: an anvil to hold the outer conductor part which is to be crimped; and a die to apply the crimping force; wherein the anvil and die each possess a part-cylindrical recess, the diameter $d_2$ of which substantially corresponds to or is slightly less than the diameter of the conductor part which is to be crimped.

The crimping tool may include the part-cylindrical recess of the die extending over an internal angle of approximately 180° and terminating in two parallel arms, having an internal distance $d_1$ between which corresponds to the diameter $d_2$ of the die recess.

The crimping tool may also include the part-cylindrical recess of the anvil extending over an internal angle of less than 180° and terminating in two arm points which, together with inner surfaces of the die arms, form a closing gap of the crimping tool.

In a second aspect, the present invention is directed to a crimping tool for forming a cold weld between a supporting sleeve, an outer conductor part, and an outer conductor of a coaxial cable, wherein the crimping tool comprises: an anvil to hold the outer conductor part which is to be crimped, the anvil including a recess with an arcuate face of a first radius of curvature, and anvil arm points at each end of the arcuate face, the internal distance between each anvil arm point being a predetermined distance $d_1$; a die to apply the crimping force, the die having a recess with an arcuate face of a second radius of curvature, wherein the die recess extends over an internal angle of approximately 180°, terminating in two parallel arms; wherein the first and second radii of curvature substantially correspond to or are less than a radius of curvature of the conductor part which is to be crimped.

The anvil recess extends over an internal angle of less than 180°, and terminating in the anvil arm points.

Inner surfaces of the die arms form a closing gap of the crimp tool with the anvil arm points when the die and the anvil are brought together to crimp the conductor part.

The anvil and the die are shaped and configured to crimp the outer conductor part in an annular form onto a supporting sleeve or a shield braid, forming both a form-locked and force-locked crimp connection.

The die and the anvil are brought together to crimp the conductor part, the closing gap font's an accumulation of displaced material, which project radially inwards and outwards.

The accumulation of displaced material is formed on the outer conductor part at approximately a height of the closing gap.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
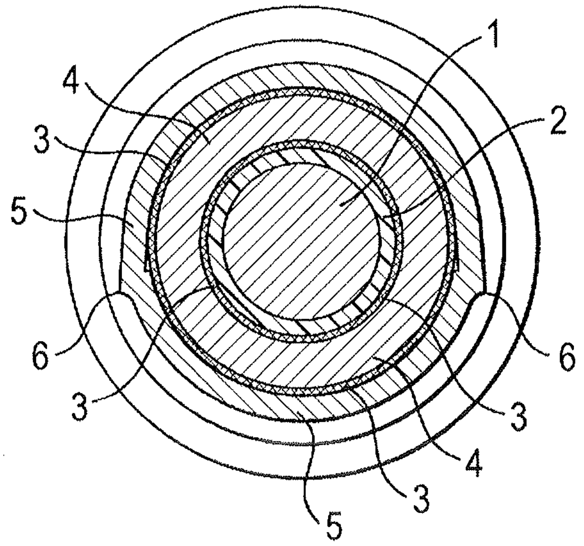
FIG. 1 shows a diagrammatic cross-sectional view of a crimp connection with a coaxial connector made using the crimping tool according to the invention.

According to the invention a hollow cylindrical supporting sleeve is arranged on the jacket, a predetermined section of the outer conductor, from which the jacket has been stripped, is pulled over the supporting sleeve, so that this section of the outer conductor is at least in part arranged radially on the outside of the supporting sleeve, and the outer conductor part is so arranged that this at least partially encloses the supporting sleeve with the outer conductor lying on the outside, radially from the outside, wherein a radial force is applied from outside on the outer conductor part over at least a part of the circumference of the outer conductor part, seen in a circumferential direction and an axial direction, in such a way that a cold weld is achieved between the supporting sleeve, the outer conductor part and the outer conductor.

This has the advantage that the outer conductor part itself serves as crimp sleeve and a force- and form-locked connection, seen in a circumferential direction, is achieved over the entire circumference and not only at separate points. The crimp connection is substantially circular in cross section.

A particularly firm crimp connection is achieved in that, due to the displaced material, at least one accumulation of material, which rises radially outwards, is formed on the outer conductor part at the height of a closing gap of a crimping tool.

An improved positive fit between the supporting sleeve and the outer conductor part as well as with the outer conductor arranged between them is achieved in that, due to the displaced material, at least one accumulation of material, which rises radially inwards, is formed on the outer conductor part at the height of a closing gap of a crimping tool.

According to the invention, in a crimping tool of the aforementioned type, the anvil and die each possess a part-cylindrical recess with a diameter $d_2$ which substantially corresponds to, or is slightly less than, the diameter of outer conductor part which is to be crimped.

This has the advantage that the crimping process can be performed in a reliably repeatable manner and at the same time a crimp connection is achieved which is radially circumferential and circular in cross section.

A particularly secure holding of the outer conductor part in the crimping tool is achieved in that the part-cylindrical recess of the die extends over an internal angle of around 180° and terminates in two parallel arms, the internal distance $d_1$ between which corresponds to the diameter $d_2$ of the die recess.

A complete contact of the crimping tool in a radial direction with an outer surface of the outer conductor part which is to be crimped is achieved in that the part-cylindrical recess of the anvil extends over an internal angle of less than 180° and terminates in two arm points which, together with inner surfaces of the die arms, form a closing gap of the crimping tool.

The crimp connection created according to the invention is based on the essential principle that the outer conductor part serving as crimp sleeve is crimped in a largely annular form onto the supporting sleeve or onto a shield braid arranged between the two, forming both a form-locked and a force-locked crimp connection.

Due to the crimping tool according to the invention, a crimp connection is created which is virtually 100% form-locking and at the same time almost completely force-locking.

Another advantage of such a design is that other materials than those previously used, for example brass, can be used for the crimp connection, i.e. for the crimp sleeve or the outer conductor part, since it is no longer necessary, as previously, to use only copper as material due to the limited connecting forces.

Figure 2:
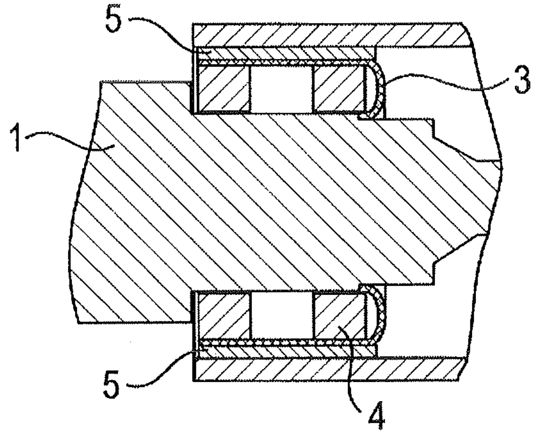
FIG. 2 shows a longitudinal section of said crimp connection.

As can be seen from FIGS. 1 and 2, the crimp connection shown is made on a coaxial connector. This has an inner conductor 1 which is usually enclosed by an inner insulation 2 as well as an outer conductor 3. This arrangement is enclosed by a supporting sleeve 4, around the outer surface of which the outer conductor 3 in the form of a shield braid is wrapped. This shield braid 3 is crimped onto the supporting sleeve 4 by means of the crimp connection. For this purpose, an outer conductor part 5 of the coaxial connector surrounding the supporting sleeve 4 and the wrapped shield braid 3, which is not shown in greater detail, is pressed together radially by means of a corresponding crimping tool in such a way that a plastic lateral deformation takes place, such that the outer conductor part 5 serving as crimp sleeve is crimped in a largely annular form onto the supporting sleeve 4 or onto a shield braid 3 arranged between the two.

As can clearly be seen from FIG. 1, due to the annular displacement of the material, small accumulations of material 6 are formed on both sides of the crimped outer conductor part 5 at the height of a closing gap of the crimping tool. These project radially both outwards and inwards, so that a strengthened positive fit with the supporting sleeve 4 or with the interposed shield braid 3 is formed.

Figure 3:
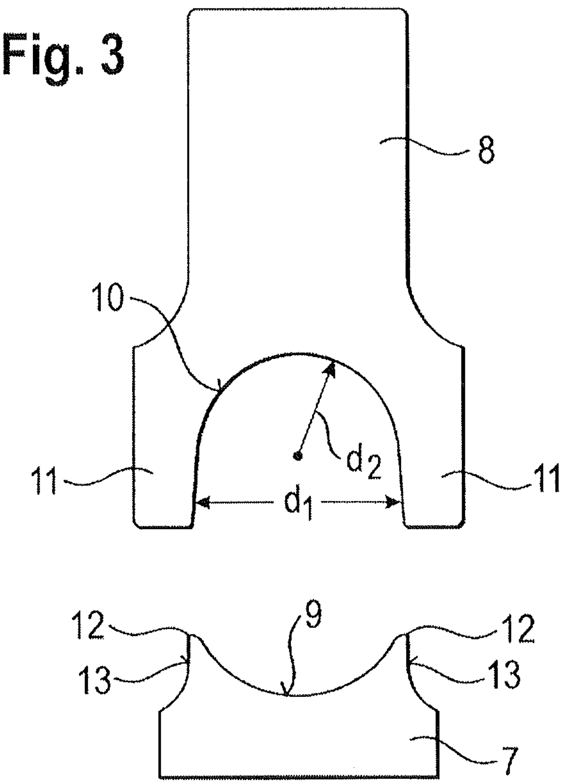
FIG. 3 shows an end view of the crimping tool with die and anvil according to the invention in open position.
Figure 4:
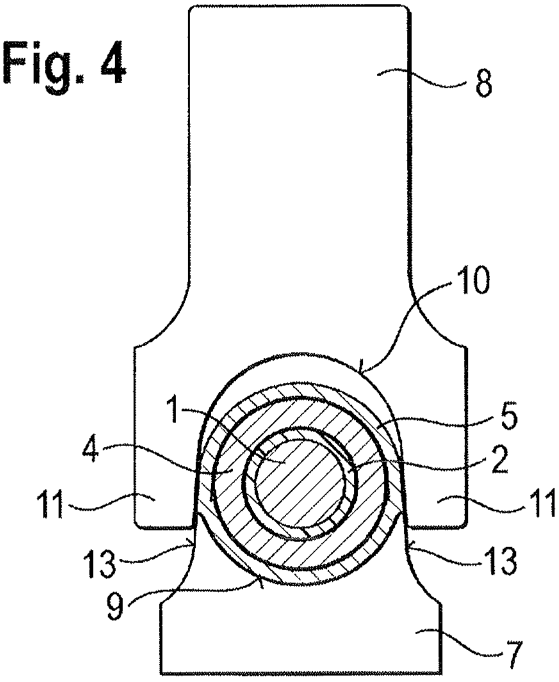
FIG. 4 shows an end view of the crimping tool with die and anvil according to the invention in closed position.

The crimping tool designed to create the described crimp connection, as shown in FIGS. 3 and 4, possesses an anvil 7 to hold the outer conductor part 5 which is to be crimped as well as a die 8 for applying the crimping force.

As can be seen, both the anvil 7 and the die 8 each have a part-circular or part-cylindrical recess 9 or 10, the diameter $d_2$ of which corresponds to or is slightly less than the diameter of the conductor part 5 which is to be crimped.

The part-cylindrical recess 10 of the die 8 extends over an internal angle of around 180° and terminates in two parallel arms 11, the internal distance $d_1$ between which corresponds to the diameter $d_2$ of the die recess 10.

As can also be seen from FIG. 3, the part-cylindrical recess 9 of the anvil 7 only extends over an internal angle of less than 180°. Also, this anvil recess 9 terminates in two arm points 12, the outer surfaces 13 of which, starting out from a distance corresponding to the internal distance $d_1$ between the die arms 11, are spaced an increasing distance apart and which, together with the inner surfaces of the die surfaces 11, form the closing gap of the crimping tool.

If the crimp connection shown in FIGS. 1 and 2 are to be created using the described crimping tool, the arrangement which is to be crimped is laid in the part-circular recess 9 of the anvil 7, whereupon the die 8, with its part-circular recess 10 is pressed downwards from above until the arm points 12 of the anvil 7 penetrate between the inner surfaces of the die arms 11, where their obliquely outwardly sloping outer surfaces 13 come to rest in a clamping action. As explained, the closing gap of the crimping tool is formed at this point, with the accumulations of material 6 of the annularly distorted outer conductor part 5 which project radially outwards and inwards also being formed at this point.

The term "hollow cylindrical" here describes a body with an outer surface and inner surface which are circular in cross section. In other words, this refers to a hollow cylinder which is rotationally symmetrical around its central longitudinal axis.

While the present invention has been particularly described, in conjunction with the specific preferred embodiment(s), it is evident that many alternatives, modifications, and variations will be apparent to those skilled in the art, in light of the foregoing description. It is therefore contemplated that the appended claims will embrace any such alternatives, modifications, and variations as falling within the true scope and spirit of the present invention.

Thus, having described the invention, what is claimed is:

1. A crimping tool for forming a cold weld between a supporting sleeve, an outer conductor part, and an outer conductor of a coaxial cable, wherein said crimping tool comprises:

an anvil to hold the outer conductor part which is to be crimped before a crimping operation to deform the outer conductor part;

a movable die to apply a crimping force;

wherein the anvil and die each possess a part-cylindrical recess having a diameter $d_2$, the diameter $d_2$ substantially corresponds to or is slightly less than the diameter of the conductor part which is to be crimped, wherein the part-cylindrical recess of the anvil extends over an internal angle of less than 180° and terminates in two arm points which, together with inner surfaces of the die arms, form a closing gap of the crimping tool, and wherein the outer surface of the anvil is in contact with the inner surface of the die, and remains in contact at the start of the crimping operation.

2. The crimping tool of claim 1 including the part-cylindrical recess of the die extending over an internal angle of approximately 180° and terminating in two parallel arms, having an internal distance $d_1$ between which corresponds to the diameter $d_2$ of the die recess.

3. A crimping tool for forming a cold weld between a supporting sleeve, an outer conductor part, and an outer conductor of a coaxial cable, wherein said crimping tool comprises:

an anvil to hold the outer conductor part which is to be crimped before a crimping operation, said anvil including a recess with an arcuate face of a first radius of curvature, and anvil arm points at each end of said arcuate face, the internal distance between each anvil arm point being a predetermined distance $d_1$;

a movable die to apply a crimping force, said die having a recess with an arcuate face of a second radius of curvature, wherein said die recess extends over an internal angle of approximately 180°, terminating in two parallel arms;

wherein the first and second radii of curvature substantially correspond to or are less than a radius of curvature of the conductor part which is to be crimped, wherein said anvil recess extends over an internal angle of less than 180° , terminating in said anvil arm points, wherein inner surfaces of said die arms form a closing gap of said crimp tool with said anvil arm points when said die and said anvil are brought together to crimp the conductor part, and wherein the outer surface of the anvil is in contact with the inner surface of the die, and remains in contact at the start of the crimping operation.

4. The crimp tool of claim 3 wherein said anvil and said die are shaped and configured to crimp said outer conductor part in an annular form onto a supporting sleeve or a shield braid, forming both a form-locked and force-locked crimp connection.

5. The crimp tool of claim 3, wherein when said die and said anvil are brought together to crimp the conductor part, said closing gap forms an accumulation of displaced material, which project radially inwards and outwards.

6. The crimp tool of claim 5 wherein said accumulation of displaced material is formed on the outer conductor part at approximately a height of said closing gap.

* * * * *